(12) United States Patent
Arai

(10) Patent No.: US 7,672,320 B2
(45) Date of Patent: Mar. 2, 2010

(54) IP COMMUNICATIONS SYSTEM FOR NOTIFYING A GATEWAY CONTROLLER OF AN IP ADDRESS ALLOCATED TO A GATEWAY AND A METHOD THEREFOR

(75) Inventor: Hideki Arai, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1240 days.

(21) Appl. No.: 11/139,000

(22) Filed: May 27, 2005

(65) Prior Publication Data

US 2005/0276272 A1   Dec. 15, 2005

(30) Foreign Application Priority Data

May 31, 2004   (JP)   ............................. 2004-161634

(51) Int. Cl.
  *H04L 12/28*   (2006.01)
(52) U.S. Cl. ..................... 370/401; 370/261; 370/392
(58) Field of Classification Search ................ 370/261, 370/262; 709/226–230, 238, 245, 246
  See application file for complete search history.

(56) References Cited

U.S. PATENT DOCUMENTS 6,427,170 B1 * 7/2002 Sitaraman et al. ........... 709/226

2002/0141352 A1 * 10/2002 Fangman et al. ............ 370/254

FOREIGN PATENT DOCUMENTS

JP   2003-163700   6/2003
JP   2003-273890   9/2003

OTHER PUBLICATIONS

"Media Gateway Control Protocol (MGCP) Verson 1.0", F. Andreasen and B. Foster, Jan. 2003.
"Gateway Control Protocol Version 1", C. Groves et al., Jun. 2003.

* cited by examiner

*Primary Examiner*—Ian N Moore
*Assistant Examiner*—Peter Cheng
(74) *Attorney, Agent, or Firm*—Venable LLP; Michael A. Sartori; Kyle D. Petaja

(57) ABSTRACT

A gateway device in an IP communications system can be controlled by a gateway controller even when an IP address of the gateway device is not fixed. The IP communications system includes a gateway device having a subscriber terminal interconnected thereto, a gateway controller for controlling the gateway device, provided on a subscriber side in accordance with a protocol conforming to the master-slave architecture, a database for providing subscriber information to the gateway controller, and an IP address allocator for dynamically allocating IP addresses. The gateway device requests the IP address allocator to allocate an IP address to acquire an IP address, and notifies the gateway controller of that IP address to get the IP address stored in the database.

38 Claims, 12 Drawing Sheets

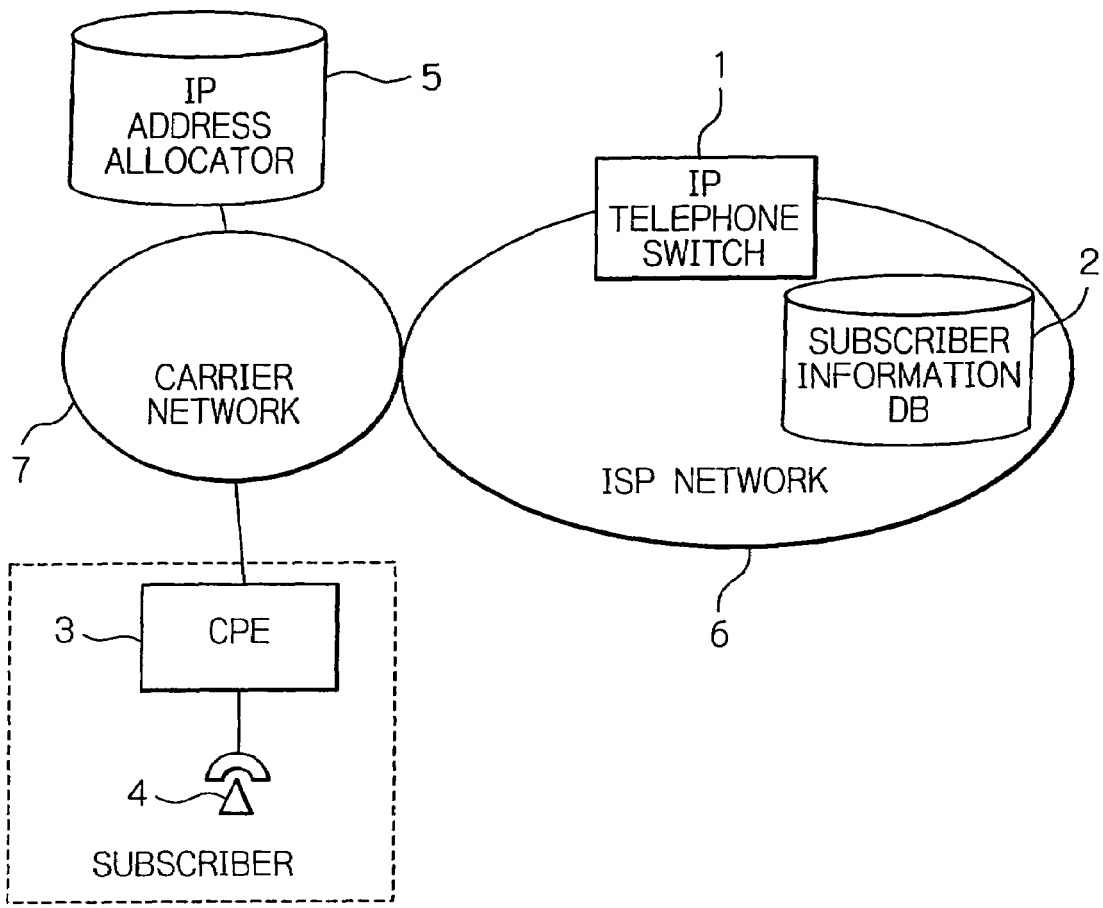

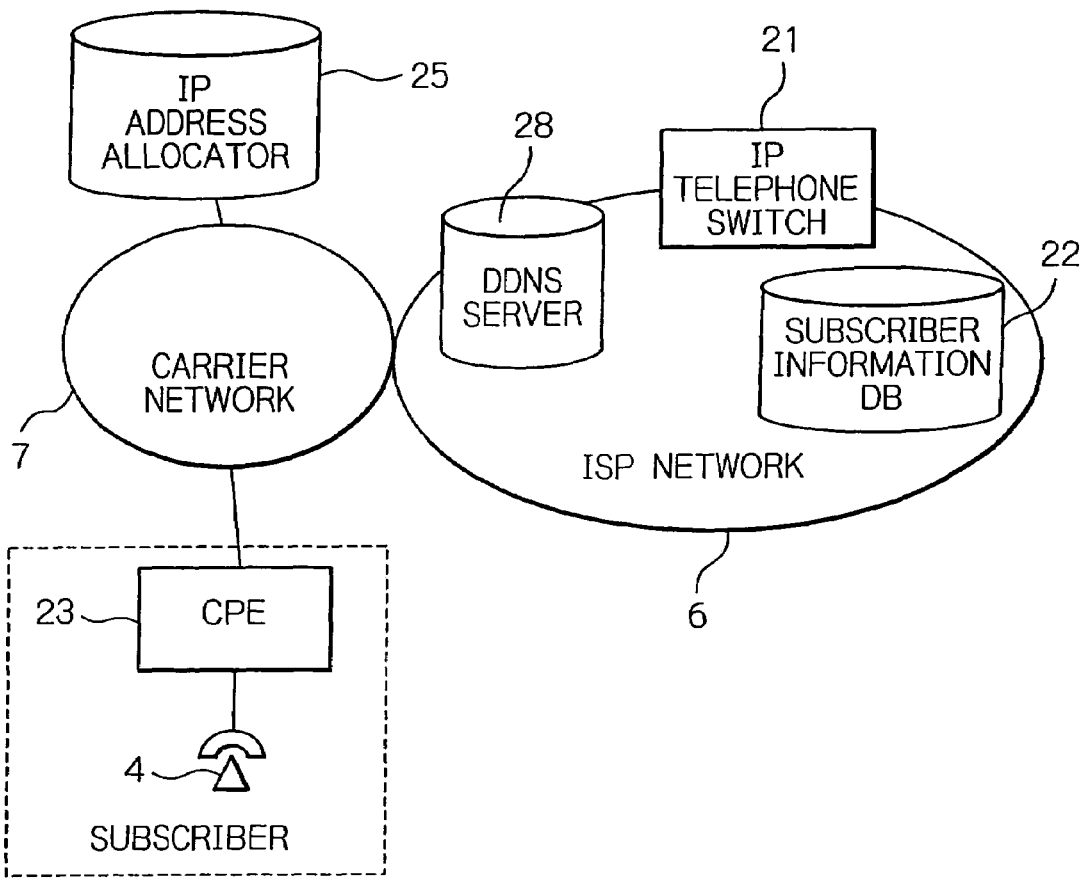

*Fig. 10*

| SUBSCRIBER TELEPHONE No. | END POINT IDENTIFIER | IP ADDRESS | TERM OF VALIDITY |
|---|---|---|---|
| SUBSCRIBER TELEPHONE No. | END POINT IDENTIFIER | IP ADDRESS | TERM OF VALIDITY |
| ⋮ | ⋮ | ⋮ | ⋮ |
| SUBSCRIBER TELEPHONE No. | END POINT IDENTIFIER | IP ADDRESS | TERM OF VALIDITY |

TERM OF VALIDITY OF IP ADDRESS

Fig. 13

| SUBSCRIBER TELEPHONE No. | END POINT IDENTIFIER | IP ADDRESS | HOST NAME | TERM OF VALIDITY |
|---|---|---|---|---|
| SUBSCRIBER TELEPHONE No. | END POINT IDENTIFIER | IP ADDRESS | HOST NAME | TERM OF VALIDITY |
| ⋮ | ⋮ | ⋮ | ⋮ | ⋮ |
| SUBSCRIBER TELEPHONE No. | END POINT IDENTIFIER | IP ADDRESS | HOST NAME | TERM OF VALIDITY |

TERM OF VALIDITY OF IP ADDRESS

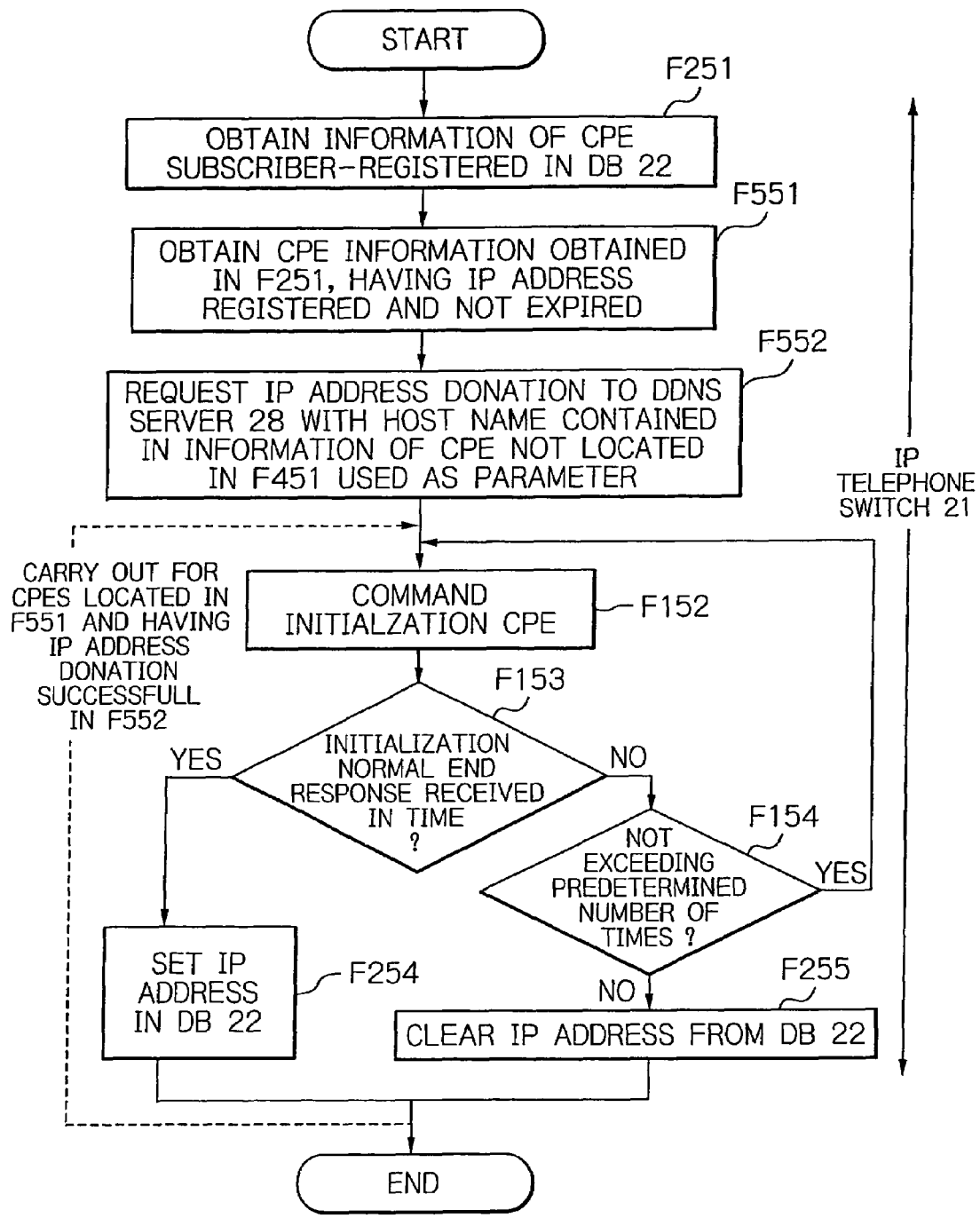

IP COMMUNICATIONS SYSTEM FOR NOTIFYING A GATEWAY CONTROLLER OF AN IP ADDRESS ALLOCATED TO A GATEWAY AND A METHOD THEREFOR

BACKGROUND OF THE INVENTION

1. Field of the Invention

The present invention relates to an IP (Internet Protocol) communications system and a method of allocating an IP address for the same. The present invention may, as an example, be applied to allocation of IP addresses in a VoIP (Voice over IP) telephone system.

2. Description of the Background Art

The VoIP signaling protocol is based on the master-slave type of architecture in which a master-slave relationship is established between devices making up a system in such a fashion that a gateway device for use in interconnecting terminal devices or different networks with each other is controlled by a gateway controller to thereby set up and control calls. More specifically, in the VoIP signaling protocol, such as Media Gateway Control Protocol (MGCP) or ITU-T (International Telecommunication Union Telecommunication Standardization Sector) Recommendations H.248.1 for TTC standard/Media Gateway Control (MEGACO), a media gateway (MG) acting as a gateway device is controlled by a media gateway controller (MGC) functioning as a gateway controller to establish or control calls under a master-slave relationship. The media gateway controller serves as a master and the media gateway as a slave.

For the Media Gateway Control Protocol, reference is made to IETF RFC3435, "Media Gateway Control Protocol (MGCP) Version 1.0", F. Andreasen and B. Foster, January 2003.

In an IP communications system constructed on the basis of such a protocol, for example a VoIP telephone system, the media gateway controller manages at least information specifying each of the media gateways it supervises and controls and in addition information as to how to control the media gateways.

For example, when a subscriber has connected the media gateway to a network, turns the power supply on, and completes the initial setting of the media gateway to set up its usable state, the media gateway notifies a specific media gateway controller controlling the media gateway itself of the readiness for use of that media gateway. Upon notified, the media gateway controller recognizes that the media gateway which has been notified is one of the media gateways the media gateway controller is to control, and instructs the operating conditions under which the media gateway controller supervises for the media gateway in question. The media gateway then operates under the operating conditions instructed by the media gateway controller.

An illustrative operation will proceed as read below. For example, when the handset of a telephone subscriber set, connected to the media gateway in question, is off-hooked, the media gateway notifies the media gateway controller of that off-hook condition, and sends out a dial tone. The media gateway receives the digit signals being dialed, and transfers, upon termination of the dialing, the received digit signals to the media gateway controller to await instructions following thereto.

In VoIP, the destination of a message transmitted between a media gateway controller and a media gateway is defined by an IP address. That gives rise to a method which, when a media gateway controller controls a media gateway, the media gateway controller is advised of the IP address of the media gateway, as information specifying the media gateway, at the outset, and performs control accordingly. Specifically, the media gateway controller permanently allocates an IP address to a media gateway, when assigned to a subscriber, to thereby able to manage the relationship of correspondence between the media gateway and the IP address. Since in such a management method, the IP address, allocated to a media gateway, is not changed as long as the media gateway remains the same, the management of information on the media gateway, such as its IP address, may be facilitated.

On the other hand, since the IP addresses under the Internet Protocol version 4 (IPv4), regulated by RFC791, so far used extensively, is of a 32-bit length, there is raised a problem that, if IP addresses are to be permanently allocated to media gateways, the IP addresses fall into shortage in IP address resources. There is also raised a problem in case a business organization providing VoIP services, or VoIP service provider, does not keep IP addresses sufficient for permanently being allocated to the subscribers therefor. Moreover, a business organization allocating IP addresses may differ from a business organization providing VoIP services. In such a case, in order to allot permanent IP addresses to media gateways, it is necessary to circulate information on IP address allocation among those different business organizations. There is however raised a further problem that such information circulation is time-consuming or expensive.

SUMMARY OF THE INVENTION

It is therefore an object of the present information to provide an IP communications system and a method allocating an IP address therefor, by means of which the aforementioned problems in allocating IP addresses may be overcome.

In accordance with an aspect of the present invention, there is provided an IP communications system comprising a gateway device a gateway device having a subscriber terminal interconnected thereto, a gateway controller provided on a subscriber side in accordance with a protocol complying with a master-slave architecture for controlling said gateway device, a subscriber information database for supplying subscriber information to the gateway controller, and an IP address allocator for dynamically allocating IP addresses. The gateway device requests the IP address allocator to allocate an IP address to acquire the IP address. The IP address is then notified to the gateway controller.

In accordance with another aspect of the present invention, there is provided a method of allocating an IP address for an IP communications system which comprises a gateway device having a subscriber terminal interconnected thereto, a gateway controller provided on a subscriber side in accordance with a protocol complying with a master-slave architecture for controlling the gateway device, a subscriber information database for supplying subscriber information to the gateway controller, and an IP address allocator for dynamically allocating IP addresses, In the method, the gateway device requests the IP address allocator to allocate an IP address to acquire the IP address. The IP address acquired is then notified to the gateway controller.

According to the present invention, since an IP address allocated by an IP address allocator to a gateway device is notified to a gateway controller serving as a master, the gateway controller is able to control the gateway device even if the IP address of the gateway device is not fixed.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing the configuration of an IP telephone system according to an embodiment of the present invention;

FIG. 2 exemplarily shows the data configuration of the subscriber information database of the illustrative embodiment shown in FIG. 1;

FIG. 5 is a schematic block diagram showing the configuration of an IP telephone system according to an alternative embodiment of the present invention;

FIG. 6 shows the data configuration of the subscriber information database of the alternative embodiment;

FIG. 10 shows the data configuration of the subscriber information database of a further alternative embodiment;

FIG. 13 shows a data configuration of the subscriber information database of a still further alternative embodiment; and FIG. 14 is a flowchart useful for understanding the operation of the re-booting of the IP telephone switch of the alternative embodiment shown in FIG. 13.

DESCRIPTION OF THE PREFERRED EMBODIMENTS

Figure 3:
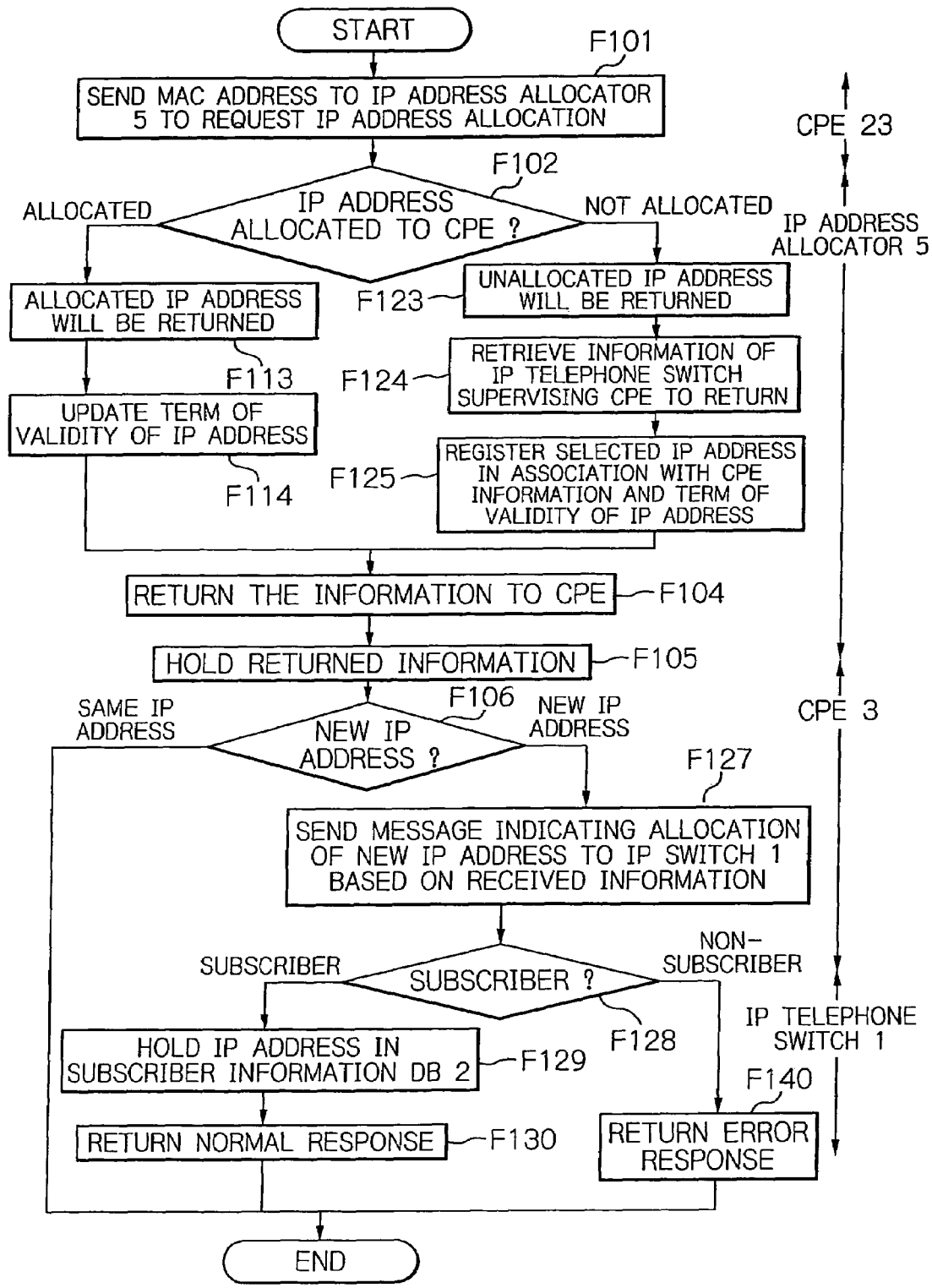
FIG. 3 is a flowchart useful for understanding the operation of the IP address allocation of the embodiment shown in FIG. 1.

With reference to the accompanying drawings, an embodiment shown in FIG. 1 of an IP (Internet Protocol) communications system will be described in detail according to the present invention. FIG. 1 schematically shows in a block diagram the configuration of an IP telephone system as an example of IP communications system in accordance with of the embodiment of the present invention. As seen in the figure, the IP telephone system of the illustrative embodiment includes, as constituent components, an IP telephone switch 1, a subscriber information database (DB) unit 2, a subscriber premises unit (CPE) 3, an analog telephone subscriber set 4 and an IP address allocator 5. The IP telephone switch 1 and the subscriber premises unit 3 serve as the aforementioned media gateway controller and media gateway, respectively.

A carrier network 7, illustrated in FIG. 1, provides public switching telephone network (PSTN) services and includes the IP address allocator 5. The carrier network 7 may be a symmetric digital subscriber lines (ADSLs), and includes the function able to allocate IP addresses for establishing Internet connections. The analog telephone set 4 is connected via the subscriber premises unit 9 to the carrier network 7. In practice, there are a number of subscriber premises units and analog telephone subscriber sets corresponding to the subscriber premises unit 3 and the analog telephone subscriber set. In the figure, however, the only one combination of unit 3 and set 4 is depicted just for simplicity.

FIG. 1 also shows an Internet service provider (ISP) network 6, which includes the IP telephone switch 1 for that Internet service provider to provide IP telephone services for subscribers, and a subscriber information database 2 for managing the subscriber information of the IP telephone services. The ISP network 6 may be replaced with an IP network specific to an Internet service provider.

The subscriber information database 2 manages subscriber information, such as an end point identifier, operating as the information identifying the subscriber premises unit 3 provided in subscriber's premises, an IP address, allocated to the subscriber premises unit 3 and a telephone number for identifying a subscriber. The end point identifier includes a MAC (Media Access Control) address, as the information for uniquely identifying the subscriber premises unit 3. The subscriber information database 2 is formed by a non-volatile storage device, such as a hard disk type of storage, in which information stored therein is not erased at least on re-booting or power down. The subscriber information database 2 may be formed by a device distinct from the IP telephone switch 1 or incorporated in the IP telephone switch 1.

The IP telephone switch 1 is adapted to use information managed by the subscriber information database 2 to control the subscriber premises unit 3, provided in the subscriber's premises, in accordance with the VoIP signal control protocol based on the architecture of the master-slave relationship, such as MGCP (Media Gateway Control Protocol), through the ISP and carrier networks 6 and 7, to thereby provide the subscriber subscribed for the carrier network 7 with IP telephone services.

The IP telephone switch 1 may be implemented in hardware by an IP private exchange (PBX) system or a workstation directed to a central office switch, not specifically shown. Specifically, the IP telephone switch 1 may include a central processor unit (CPU), a main memory, an auxiliary storage device, such as a hard disk type of storage, and an IP communications unit, and be equipped with the following functions, for example.

The IP telephone switch 1 has an identifying information collating function of receiving a message notifying the allocation of an IP address from the subscriber premises unit 3, and collating, upon the reception of the message, identifying information included in the message and identifying the subscriber premises unit 3 to the information managed by the subscriber information database 2. The IP telephone switch 1 also includes an IP address holding function of acquiring, when successful in the collation, the IP address of a source transmitter included in an IP packet of the message, and of having the so acquired IP address stored in the subscriber information database 2 as an IP address matched to the identification information of the relevant subscriber premises unit 3.

The IP telephone switch 1 also has an initializing command message sending-out function of acquiring, when its power supply is repetitively turned on and off or reset to cause its main memory enclosed to be initialized, the information pertinent to the totality of registered subscribers from the subscriber information database 2 to send out a command message for initializing the state of the subscriber premises unit 3 holding the IP addresses. The IP telephone switch 1 also has an initializing response confirming function of repeating, if a response to the effect of success in the initialization is not received within a predetermined period of time interval from the CPU 3, the operation of sending out the initializing command message a predetermined number of times. The IP telephone switch 1 also has an address nullifying function of nullifying, in case a response of the success in the initialization is not received despite sending out the command message the predetermined number of times, the appropriate IP address set in the subscriber information database 2.

The subscriber premises unit 3 has a splitting function of separating the signal of telephone services, provided by the PSTN network and transmitted from the carrier network 7 to the subscriber, from the a signal of IP services, such as ADSL signals, or conversely, mixing these two signals. This function is generally implemented by the hardware. The subscriber premises unit 3 also includes: a function of IP address acquisition. Specifically, with the function, information for uniquely identifying the own apparatus, such as MAC address of the own apparatus, is transmitted, upon power up or initialization of the own apparatus, to the IP address allocator 5 to thereby request the donation of the IP address and the acquisition of the identifying information of the IP telephone switch 1 supervising the subscriber premises unit 3, and the information sent from the IP address allocator 5 in response to the request is received to hold the so received information.

The subscriber premises unit 3 also includes: a function of using the IP address accorded from the IP address allocator 5 to establish a connection to the Internet, and an analog telephone set connecting function of connecting the analog telephone set 4. The subscriber premises unit 3 also has a voice communication function of processing control signals for connecting the analog telephone set 4 and handling its voice codec function for providing the IP telephone services. The latter function may be exemplified by a VoIP and a telephony adapter (TA) function. The subscriber premises unit 3 also has a control signal issuing function of issuing, on acquisition of the IP address, a control signal which is based on the IP telephone control signal processing and has an end point identifier including a MAC address as the information for uniquely identifying the own subscriber premises unit 3. The subscriber premises unit 3 is also provided with a PSTN telephone service providing function of providing the PSTN telephone services to be enjoyed by means of the connected analog telephone set 4. Thus, in the illustrative embodiment, the subscriber premises unit 3 has the architecture of providing the aforementioned functions inherent to the media gateway.

The subscriber premises unit 3 holds an address for the IP address allocator 5 for enabling communication with the IP address allocator 5 even immediately after installed.

The IP address allocator 5 may be implemented in hardware by, for example, a so-called server or a router equipped with the functions described above. The IP address allocator 5 is adapted to store, as with, e.g. a DHCP (Dynamic Host Configuration Protocol) server, data representative of the relationship between the identification information, such as MAC addresses of all subscriber premises units allowed for donation of IP addresses, and the identification information of the IP telephone switch 1 supervising that subscriber premises unit, as well as a list of the IP addresses.

The list of the IP addresses is structured in such a fashion that, from one IP address to another, for example, at least the identification information of the subscriber premises unit 3 to which the IP address is allocated may be managed in association with its term of validity. Specifically, the IP addresses already allocated are stored with the identification information of the subscriber premises unit 3 and the term of validity, while the IP addresses, not donated, have the information not set, so that management may be made as to whether or not the IP addresses have already been allocated.

The IP address allocator 5 confirms, responsively to the request for allocation of the IP address from the subscriber premises unit 3, that the identification information of the subscriber premises unit 3, which has made the request, is held. If the identification information of the subscriber premises unit 3 is held in the list of the IP addresses, the same IP address is re-allocated and the term of validity is updated. If the identification information of the subscriber premises unit 3, which has made the request for allocation of the IP address, is not held in the list of the IP addresses, one of the non-allocated IP addresses is selected, and the IP address and the identification information of the IP telephone switch 1 are returned. In addition, in the storage location having that IP address in the list of the IP addresses, the identification information of the subscriber premises unit to which the IP address has been allocated and its term of validity will be stored correlatively with each other.

In the illustrative embodiment shown in FIG. 1, the IP address allocator 5 is interconnected to the carrier network 7. Alternatively, the IP address allocator 5 may be interconnected to the ISP network 6.

The operation of the IP telephone system of the illustrative embodiment will now be described. For an illustrative purpose only, the subscriber premises unit 3 and the analog telephone set 4 owned by a subscriber who subscribes to a telephonic and an ADSL service provided by a PSTN communications business organization owning the carrier network 7, while subscribing to an Internet accessing and an IP telephonic service provided by the Internet service provider owning the ISP network 6. To the subscriber premises unit 3 of this subscriber, one of the unallocated IP addresses, managed by the IP address allocator 5, is selected in response to a request from the subscriber premises unit 3 and allotted to the subscriber premises unit 3.

Referring to the flowchart shown in FIG. 3, the operation of allocating an IP address of the IP telephone system of the illustrative embodiment will be described. The subscriber premises unit 3 is responsive to its initialization, such as power up or resetting, and sends out the information uniquely identifying the own unit, i.e. at least its own MAC address, to the IP address allocator 5 to thereby make a request for allocation of an IP address, step F101.

In the IP address allocator 5, it is confirmed, based on the information managed by the apparatus, whether or not the IP address has already been allocated to the subscriber premises unit 3, step F102. If an IP address has already been allocated, the IP address already allocated is maintained so that that IP address will be returned, step F113, with its term of validity updated, step F114. On the other hand, if no IP address has been allocated to the subscriber premises unit 3 which has made the request, the IP address allocator 5 selects one of the unallocated IP addresses which it is taking charge of, step F123. The IP address allocator 5 retrieves the identification information of the IP telephone switch 1, supervising this subscriber premises unit 3, step F124. Both the IP address and the identification information of the IP telephone switch 1 will be returned while those pieces of information of the subscriber premises unit 3 and the term of validity thereof will be registered in the storage location of the so selected IP address, step F125.

The IP address allocator 5 returns those pieces of information, as described above, to the source of request, i.e. the subscriber premises unit 3, step F104. On receipt of the returned information, the subscriber premises unit 3 holds the received information, step F105, while determining whether or not the IP address, already allocated, has been received, step F106.

If an IP address has already been allocated and IP address allocation has been requested within the term of validity, so that the IP address already allocated has been returned from the IP address allocator 5, then the IP address continues to be used. If a subscriber premises unit 3 has newly been established or the term of validity of the IP address of the subscriber premises unit 3 has expired, then the IP address received is made the IP address of the own unit, and a message of the VoIP signaling protocol representing that a new IP address has been allocated is sent to the IP telephone switch 1, which has received the identification information, using an end point identifier, representing the own subscriber premises unit 3, as the key information, step F127. In this end point identifier, there is included a MAC address for uniquely identifying this subscriber premises unit 3.

Upon receipt of the message, notifying the allocation of the IP address, the IP telephone switch 1 accesses the subscriber information database 2, based on the end point identifier, included in the message as the key information, to determine whether or not the source of transmission is a subscriber, step F128. If the source of transmission has been determined to be a subscriber, the IP address of an IP packet constituting that message is held in the subscriber information database 2, step F129, and an affirmative response is returned to this subscriber premises unit 3, step F130. Otherwise, the IP telephone switch 1 returns an error response to the subscriber premises unit 3, step F140. After returning the affirmative response, the IP telephone switch 1 is ready to control the subscriber premises unit 3.

Figure 4:
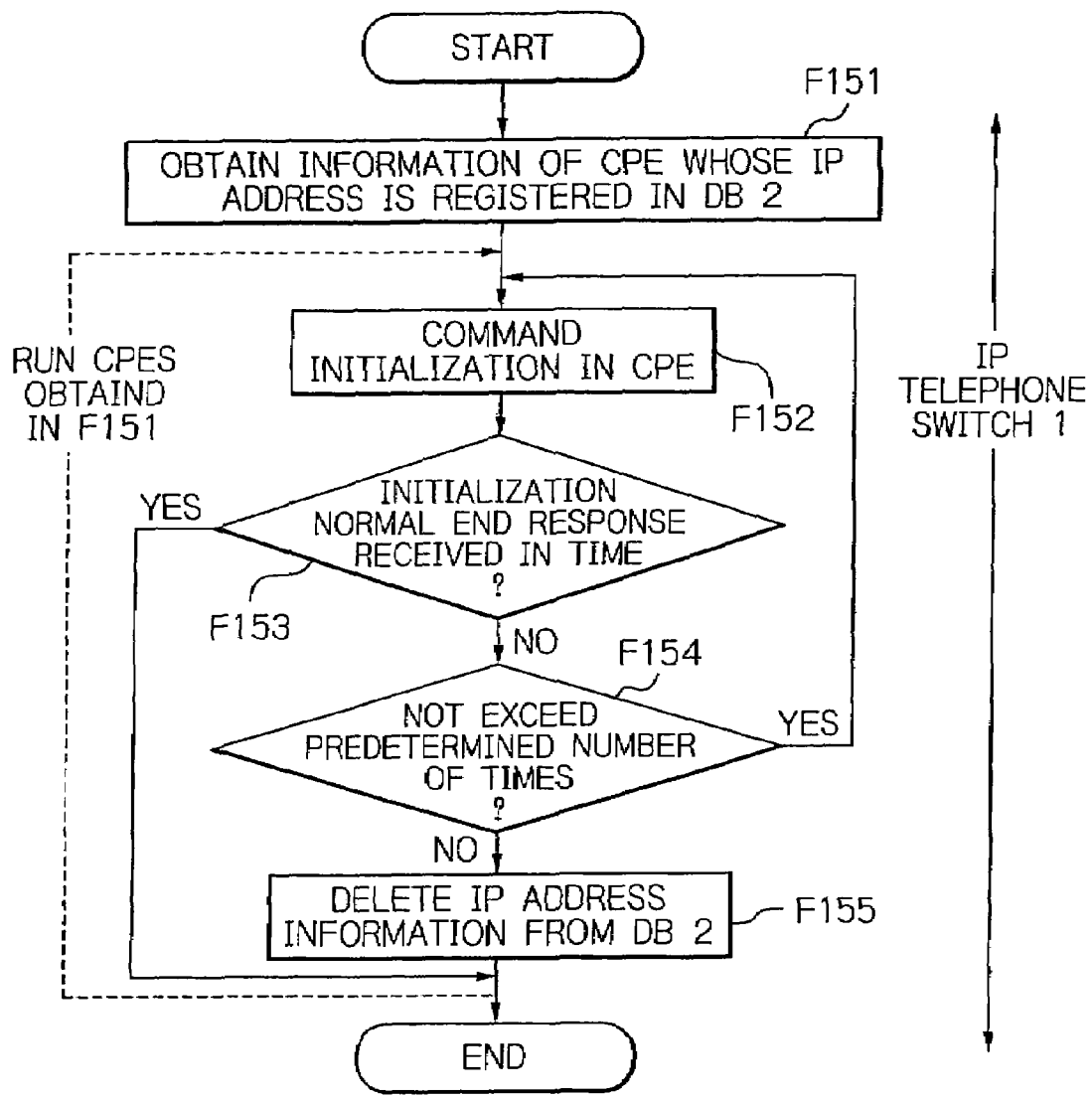
FIG. 4 is a flowchart useful for understanding the operation of the re-booting of the IP telephone switch of the illustrative embodiment.

The operation will now be described in which the information on a main memory as a volatile storage area has been erased due to e.g. rebooting, in the IP telephone switch 1, with reference to the flowchart shown in FIG. 4. On an information erasure due to e.g. re-booting, the IP telephone switch 1 references the subscriber information database 2 to retrieve the information of the subscriber premises units 3 from the list, FIG. 2, in which the IP addresses have been registered, step F151. The following steps F152 to F155 will be carried out for each of the subscriber premises units thus retrieved.

The IP telephone switch 1 commands that the subscriber premises units 3 to be processed be initialized. For example, an installed application, capable of executing VoIP, will be initialized, step F152. It is then determined whether or not a response representative of the normal end of the operations has been received within a predetermined period of time from the subscriber premises unit 3 commanded to be initialized, step F153. If the response representative of the normal end of the operations has been received, then the IP telephone switch 1 executes the above-mentioned step F152 on another subscriber premises unit 3 to be processed.

If a response representative of the normal end of the operations has not been received in the period of time, then the IP telephone switch 1 determines whether or not the initializing operations have been repeated a predetermined number of times, step F154. If the initializing operations have not been repeated the predetermined number of times, then the IP telephone switch 1 issues again the initializing command to the same subscriber premises unit 3, step F152. If the number of times of the repetitive initializing operations exceeds the predetermined value, then the IP telephone switch 1 deletes the IP address of the subscriber premises unit 3 under processing from the subscriber information database 2, step F155.

In the event of information erasure caused by e.g. re-booting, the IP telephone switch 1 thus confirms that control based on the architecture of the master-slave relationship such as MGCP can be carried out over the subscriber premises unit 3. If the IP telephone switch 1 is unable to confirm the above, it deletes the IP address of the subscriber premises unit 3.

In the illustrative embodiment, when the IP address, allocated to the subscriber premises unit 3, changes, the subscriber premises unit 3 notifies the IP telephone switch 1 of a newly allocated IP address in response to the change in the IP address by means of a VoIP signaling message, with an end point identifier, including a MAC address capable of uniquely identifying the subscriber premises unit 3, serving as a key. Hence, the IP telephone switch 1, supervising the subscriber premises unit 3, references the IP address of the source of transmission of an IP packet of the notifying message to thereby supervise the relational correspondence between the end point identifier and the IP address with a key served by the end point identifier. The telephone switch 1 may thereby control the subscriber premises unit 3.

Referring to FIG. 5, an alternative embodiment of the IP communications system will be described in detail according to the present invention. FIG. 5 shows, in a schematic block diagram, the configuration of an IP communications system, specifically IP telephone system, of the alternative embodiment. In the following, the like parts and components are designated with the same reference numerals.

The alternative embodiment shown in FIG. 5 may be the same as the embodiment shown in FIG. 1 except for addition, as a constituent element, of a dynamic domain name system (DDNS) server 28, provided in the ISP network 6. The alternative embodiment comprises an IP telephone switch 21, a subscriber information database 22, a subscriber premises unit 23 and an IP address allocator 25, which may be almost the same as but differ in function slightly from the corresponding components of the embodiment shown in FIG. 1.

The DDNS server 28 is a server defined by RFC 1995 or RFC 1996 extended from the DNS system providing, in the TCP/IP network environment, the services for enabling a host name to deduce a corresponding IP address. The DDNS server is superior to the domain name server (DNS) in the possibility of giving a notification instantaneously upon changes in the database and transmitting only data of the changed portion thereof, thereby reducing the network traffic.

The DDNS server 28, installed in the ISP network 6, has the function of accepting a request for registration from the subscriber premises unit 23, with at least the host name and the IP address used as parameters, to store the request received into a non-volatile memory area of the own server, and of returning a relevant IP address responsively to a request for donation of an IP address from the IP telephone switch 21 with at least the host name used as a parameter.

The subscriber information database 22 of the alternative embodiment shown in FIG. 5 manages, as seen from FIG. 6, a host name for identifying the subscriber premises unit 3, in addition to the telephone number, the endpoint identifier and the IP address, similarly to the embodiment shown in FIG. 1.

The IP telephone switch 21 may be the same as the corresponding device of the embodiment shown in FIG. 1 except for the functional part operating in such a manner that, when the main memory enclosed is initialized due to a predefined event, information pertinent to the totality of the registered subscribers, see FIG. 6, is acquired from the subscriber information database 22, and a request is made to the DDNS server 28 to donate the IP address based on the host name included therein. The functional part is further adapted to set, for the subscriber premises unit 3 having its host name to which the IP address has been acquired, an IP address portion in a relevant record of the subscriber information database 22, and to provide the subscriber premises unit 3 with an initialization command message for initializing the state of the unit 3.

The subscriber premises unit 23 of the alternative embodiment shown in FIG. 5 may be identical with that of the embodiment shown in FIG. 1 except for the former having a functional part serving as a DDNS client, which requests, upon allocation of a new IP address, the DDNS server 28 to register the IP address with at least the own host name and the allocated IP address used as parameters.

The IP address allocator 25 of the alternative embodiment shown in FIG. 5 may be the same as the corresponding unit of the embodiment shown in FIG. 1 except for the former additionally having the functional part for managing identification information accessible to the associated DDNS server 28 from one subscriber premises unit 3 to another, and for incorporating that information into other information to transmit at the time of allocating an IP address.

The operation of the IP telephone system of the alternative embodiment shown in FIG. 5 will now be described in the sequence of the operations for allocating an IP address and of re-booting of the IP telephone switch.

Figure 7:
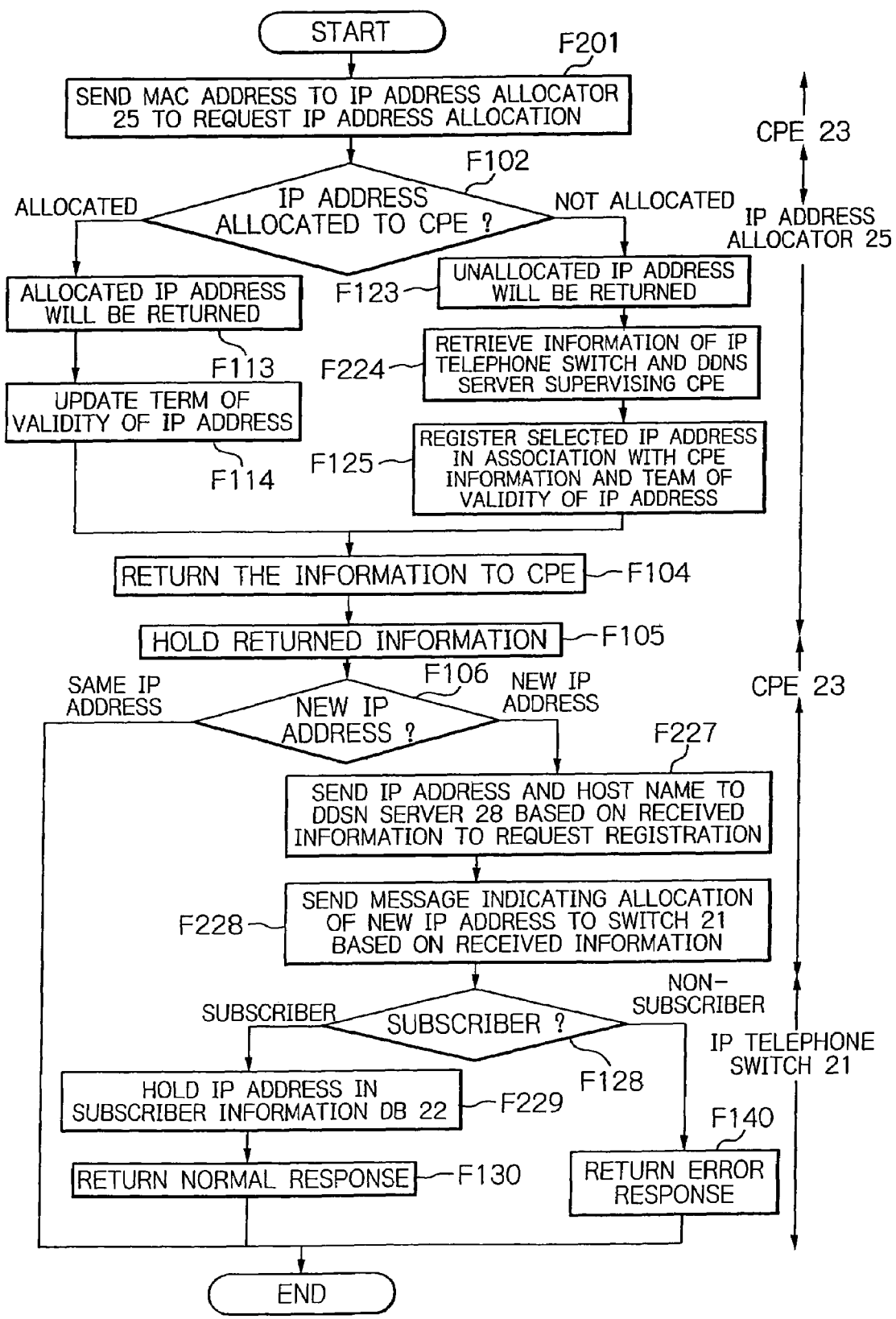
FIG. 7 is a flowchart useful for understanding the operation of the IP address allocation of the alternative embodiment shown in FIG. 5.

Referring to the flowchart shown in FIG. 7, the operation will be described of allocating an IP address in the IP telephone system of the alternative embodiment shown in FIG. 5. The subscriber premises unit 3 is responsive to the initialization of the own unit, such as power up or resetting, to supply the IP address allocator 25 with at least its own MAC address as information uniquely identifying the own unit to thereby make a request for allocation of an IP address, step F201. The IP address allocator 25 confirms whether or not an IP address has already been allocated to the subscriber premises unit 23, based on the information managed in the own apparatus, step F202. If an IP address has already been allocated thereto, the operation of the IP address allocator 25 may proceed in the same manner as with the embodiment shown in FIG. 1, steps F113, F114 and F104.

If no IP address has been allocated to the subscriber premises unit 23 which made a request for allocation, the IP address allocator 25 selects one of the unallocated IP addresses which it is taking charge of, step F123. The IP address allocator retrieves the identification information of the IP telephone switch 1, supervising this subscriber premises unit 3, as well as information necessary for accessing to the DDNS server 28 to which the IP address and the host name are to be registered, step F224. The IP address, the identification information of the IP telephone switch 1 and the access information for the DDNS server 28 will be returned, and those pieces of information on the subscriber premises unit 3 as well as the term of validity thereof will be registered in a storage location of the so selected IP address, step F125. The alternative embodiment shown in FIG. 5 thus differs from the embodiment shown in FIG. 1 in retrieving information for accessing the DDNS server 28.

It is the same as the embodiment shown in FIG. 1 how the alternative embodiment proceeds to the processing of the IP address allocator 25 returning the information to the subscriber premises unit 23 having forwarded the request, and to the processing of the subscriber premises unit 23 holding the so received information and subsequently confirming whether or not the IP address already allocated has been returned, steps F104 to F106. It is also the same as the embodiment shown in FIG. 1 how the alternative embodiment proceeds to the processing of the subscriber premises unit 3 when the already allocated IP address is returned.

If the subscriber premises unit 23 has been newly installed or the term of validity of the IP address concerning the CPU 23 has expired and hence the new IP address has been returned to the subscriber premises unit 23, then the identification information for accessing the DDNS server 28, which information is one piece of information received from the IP address allocator 25, is used with at least the allocated IP address and the own host name serving as parameters to request the DDNS server 28 to register the host name and the IP address, step F227.

Then, the received IP address is used as an IP address of the own unit, and the IP telephone switch 21, which has received the identification information, is fed with a message of the VoIP signaling protocol representing that a new IP address has been allocated with the end point identifier, representing the own subscriber premises unit 23, used as key information, step F228. The IP telephone switch 21 accesses the subscriber information database 22, based on the end point identifier included in this message as the key information, to determine whether or not the source is a subscriber, step F128. The IP telephone switch 21 performs, based on the determined results, the processing similar to that of the embodiment shown in FIG. 1.

Figure 8:
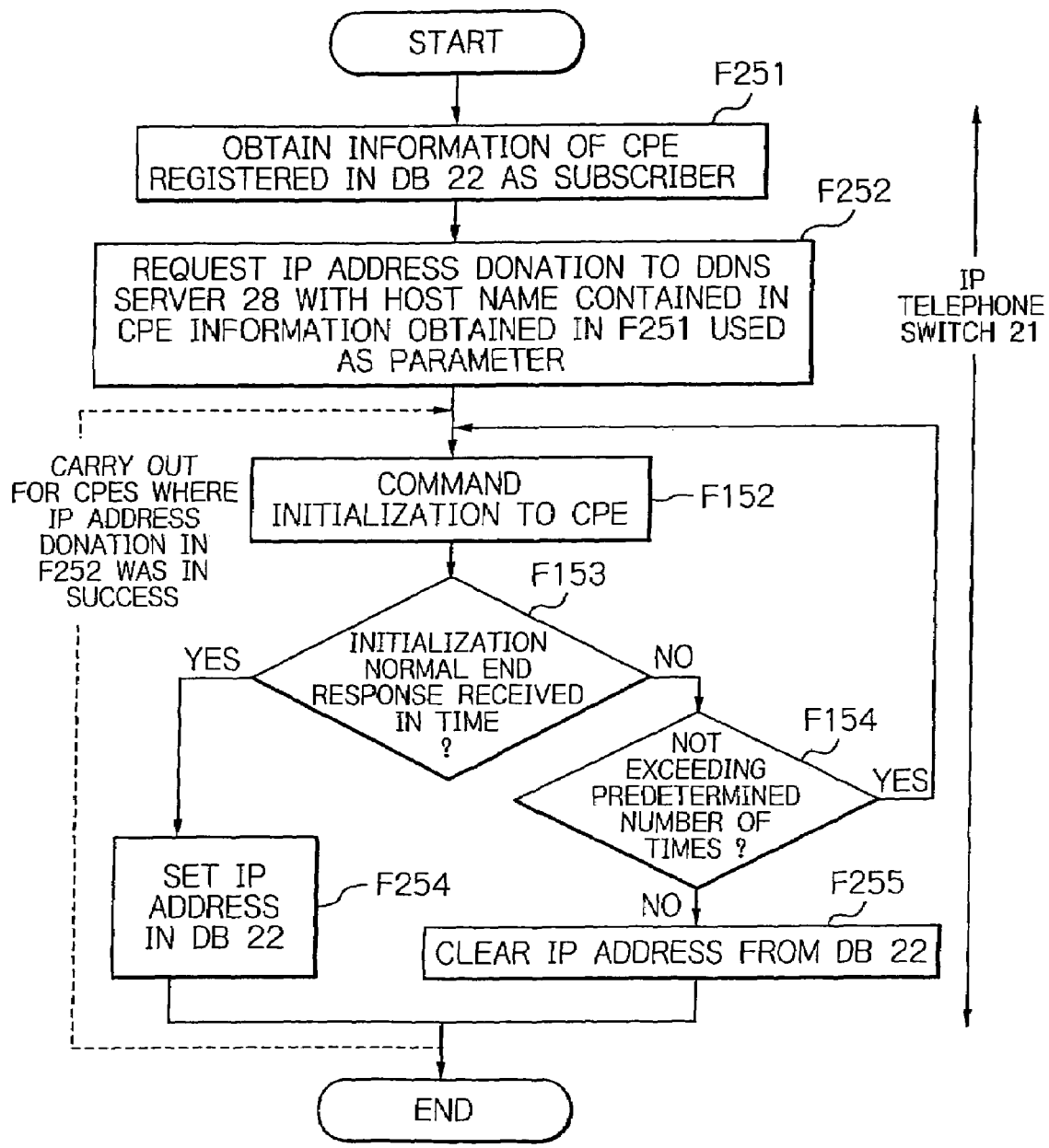
FIG. 8 is a flowchart useful for understanding the operation of the re-booting of the IP telephone switch of the alternative embodiment shown in FIG. 5.

The operation will now be described in which the information on the main memory as a volatile memory area has been erased due o e.g. rebooting, in the IP telephone switch 21, with reference to the flowchart shown in FIG. 8. The IP telephone switch 21 is responsive to the above-stated event to reference the subscriber information database 22, and collect data pertinent to the subscribers shown in FIG. 6, step F251. The switch 21 then requests the DDNS server 28 to donate the IP addresses to the totality of the subscriber premises units 23 thus collected, with at least the host name used as parameter, step F252. The switch 21 executes the following processing for the totality of the subscriber premises units 23 for which the IP addresses have been collected.

The IP telephone switch 21 commands the target subscriber premises unit 3 to be initialized, step F152, and determines whether or not a response for normal end has been received from the target CPU 3 within a predetermined period of time, step F153. If the normal end response has been received, the IP telephone switch 21 sets the IP address in a field of the IP address of the relevant subscriber premises unit 23 of the subscriber information database 22, step F254, and then carries out the above step F152 on another subscriber premises unit 23 to be processed. If no normal end response has been received in the period of time, the IP telephone switch 21 determines whether or not the initializing operations have been repeated a predetermined number of times, step F154. If the initializing operations have been repeated the predetermined number of times, the initializing command is issued again for the same subscriber premises unit 3, step F152. Otherwise, the IP address in the subscriber information database 22 of the subscriber premises unit 23 being processed is cleared, step F255.

With the alternative embodiment shown in FIG. 5, the following meritorious effect may be expected, in addition to those similar to those of the embodiment shown in FIG. 1. Since the relational correspondence between the host name and the IP address of the subscriber premises unit 23 is registered in the DDNS server 28, a correct IP address may be acquired by the IP telephone switch 21 making an inquiry at the DDNS server 28, even when the IP address of the CPU 23 has been changed during cessation of operation in the IP telephone switch 21.

Referring to the accompanying drawings, another alternative embodiment of the IP communications system according to the present invention will now be described. The architecture of an IP communications system, specifically IP telephone system, of the alternative embodiment may also be represented by FIG. 5. The alternative embodiment slightly differs from the alternative embodiment shown in FIG. 5 in the function of the IP telephone switch 21.

The IP telephone switch 21 of the illustrative, alternative embodiment may be the same as the embodiment shown in and described with reference to FIG. 5 except for the following points. The illustrative embodiment has the function of acquiring the host name of the subscriber premises unit 23, based on data shown in FIG. 6, upon receipt of a notification of IP address allocation from the subscriber premises unit 23, and requesting the DDNS server 28 to donate an IP address with at least the host name used as a parameter, and receiving a result therefrom. The instant embodiment also has the function of collating the IP address acquired by the DDNS server 28 to an IP address of the source of transmission included in an IP packet constituting the notification on IP address allocation transferred from the subscriber premises unit 23, and of holding, only in the case of coincidence between the two addresses, the IP address as an IP address of the subscriber premises unit 23 in the subscriber information database 22.

Figure 9:
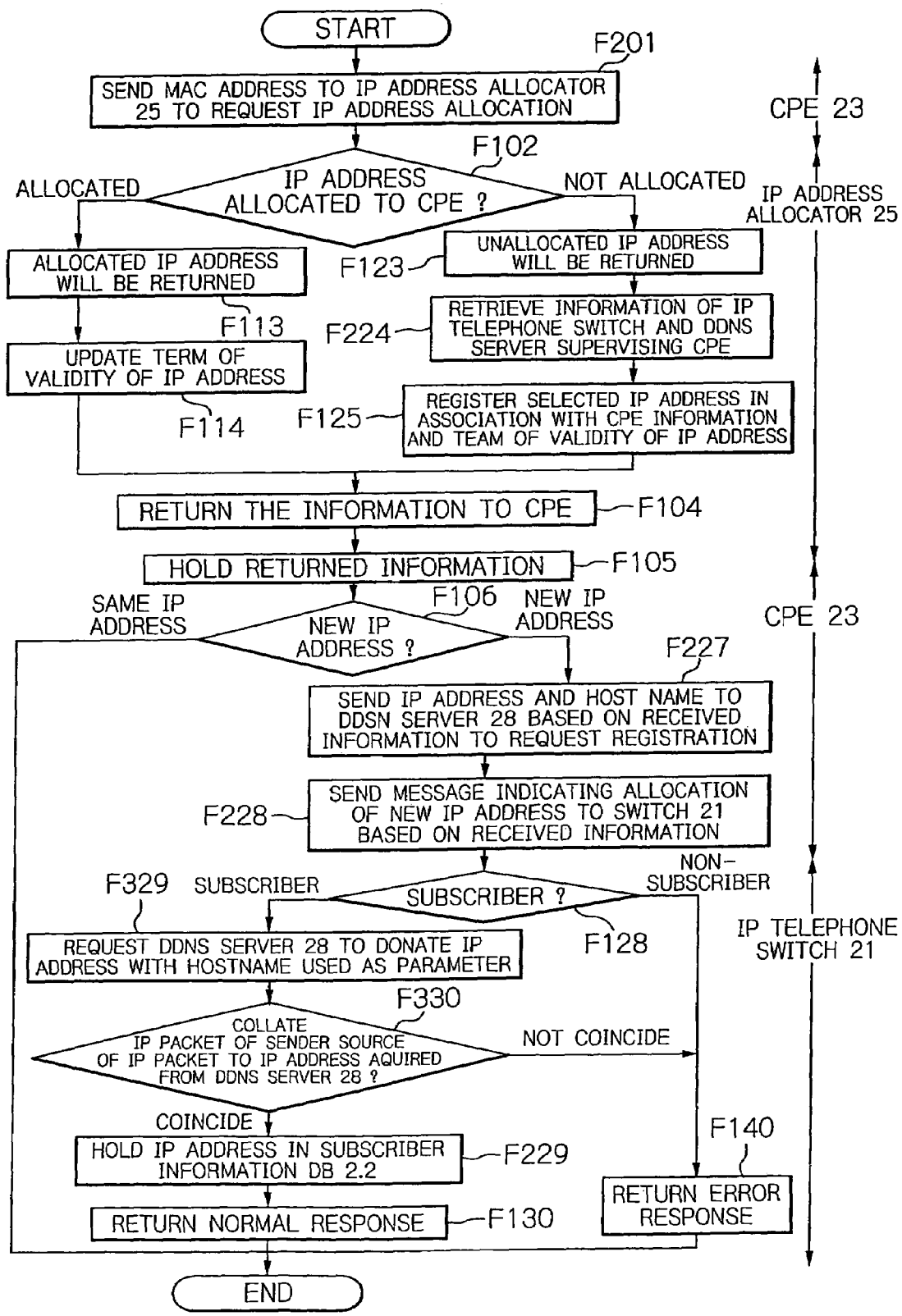
FIG. 9 is a flowchart useful for understanding the operation of the IP address allocation of another alternative embodiment.

FIG. 9 depicts a control flow of the operation allocating an IP address in accordance with a further alternative embodiment. The same steps as those of the alternative embodiments shown in FIGS. 5 and 7 are denoted with the same reference numerals. In the alternative embodiment shown in FIG. 9, the operation is the same as that of the alternative embodiment shown in FIG. 5 in terms of the operation of transmitting a message of the VoIP signaling protocol e.g. in the form of IP packet of a notification of IP address allocation, with an end point identifier, representing the own subscriber premises unit 23 used as key information, step F228, through the operation of the IP telephone switch 21 retrieving the subscriber information database 22, based on the endpoint identifier included as the key information in the message received from the own subscriber premises unit 23, to determine whether or not the source is a subscriber, step F128. The operation performed when it has been determined that the source is not a subscriber is also the same as that of the alternative embodiment shown in FIG. 5.

When the source has been determined to be a subscriber, the IP telephone switch 21 acquires the host name of the subscriber premises unit 23, based on the data shown in FIG. 6, to request the DDNS server 28 to donate the IP address with at least the host name used as a parameter, step F329, and collates an IP address of the source of transmission included in an IP packet constituting the notification of allocation of the IP address transferred from the subscriber premises unit 23 to an IP address returned from the DDNS server 28, step F330. Only when the two addresses coincide with each other, the IP telephone switch 21 determines the IP address as the IP address of the subscriber premises unit 23 to store the address in the subscriber information database 22, step F229. The switch 21 will subsequently return a normal response to the subscriber premises unit 23, step F130.

With the instant illustrative embodiment, there may be obtained, in addition to the meritorious effect of the alternative embodiment shown in FIG. 5, a further meritorious effect that the IP telephone switch 21 collating the IP address of the source of transmission of the subscriber premises unit 23, which has sent the notification of the IP address allocation, to the IP address actually registered in the DDNS server 28 results in enhancing the source of the request in authentication fidelity much more than with the alternative embodiment shown in FIG. 5.

Now, referring to the drawings, the IP communications system for allocating the IP address will be described in detail according to a still further embodiment of the present invention. The architecture of the IP communications system of the instant, alternative embodiment, specifically IP telephone system, may again be represented by FIG. 1. The IP telephone system of the instant alternative embodiment may be the same in structure as the embodiment shown in FIG. 1, but differs slightly in the function of the IP telephone switch 1, information held by the subscriber information database 2 and the function of the subscriber premises unit 3.

The subscriber information database 2 of the instant, alternative embodiment may be the same as that of the embodiment shown in FIG. 1 except for the former having a field for setting the term of validity of the IP address, as shown in FIG. 10. The subscriber premises unit 3 of the alternative embodiment may be the same as that of the embodiment shown in FIG. 1 except for the former having the function of notifying the IP telephone switch 1 of the term of validity together with a notification of the IP address allocation.

The IP telephone switch 1 of the alternative embodiment may be identical with the embodiment shown in FIG. 1 except for the former having the function of setting, upon receipt from the subscriber premises unit 3 of the notification for the allocation of the IP address, the term of validity received in a field of the term of validity of the subscriber premises unit 3 shown in FIG. 10, the function of referencing the term of validity in processing calls to proceed to call processing only when the term has not expired, and the function of referencing the term of validity when the main memory is initialized by powering on or off or resetting the own apparatus to command the initialization of the subscriber premises unit 3 only when the term has not expired.

Figure 11:
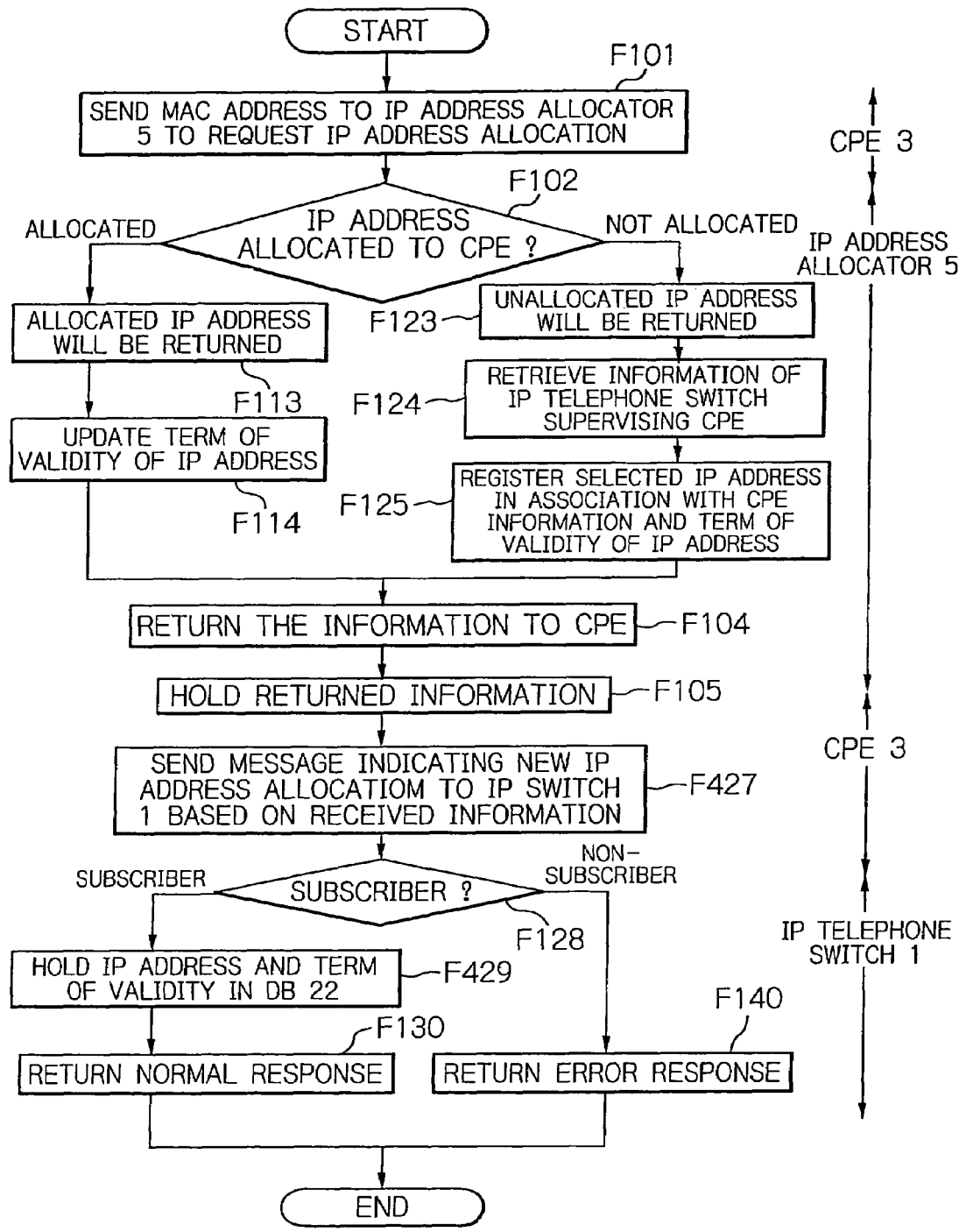
FIG. 11 is a flowchart useful for understanding the operation of the IP address allocation of the alternative embodiment shown in FIG. 10.

FIG. 11 depicts a control flow of the operation of allocating the IP address according to a still further embodiment of the present invention. The same steps as those shown in FIG. 3 are designated with the same reference numerals. In the instant, alternative embodiment, the operation is the same as that of the embodiment shown in FIG. 1 in respect of the subscriber premises unit 3 requesting the IP address allocator 5 to allocate an IP address, receiving and holding the return information, steps F101 to F105.

In the present, alternative embodiment, the subscriber premises unit 3 uses, regardless of whether or not the IP address has been allotted, as an address access information to the IP telephone switch 1, received from the IP address allocator 5, and sends out the notification of the IP address allocation together with at least the term of validity of the IP address, step F427.

The IP telephone switch 1, notified of the allocation of the IP address, accesses the subscriber information database 2, based on the end point identifier included in the notification, step F128, to determine whether or not the source of transmission is a subscriber. If the source of transmission has been determined to be a subscriber, the IP address of the source of transmission of an IP packet of this notification and the term of validity are held in the subscriber information database 2, step F429, and a normal response is in turn returned to the subscriber premises unit 3 of the source of transmission, step F130. If the source of transmission has been determined to be not a subscriber, an error response is returned to the subscriber premises unit 3 of the source of transmission, step F140.

Figure 12:
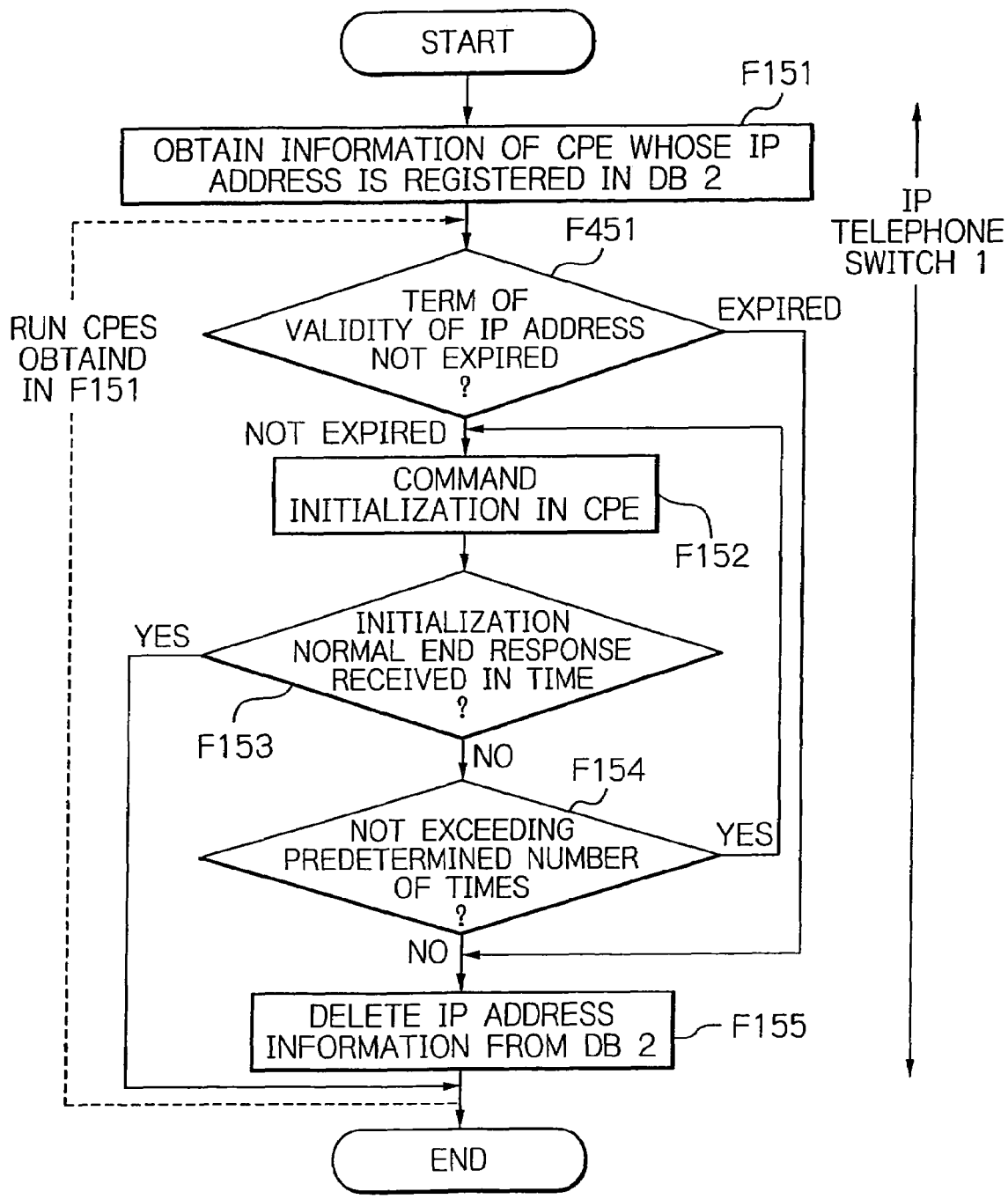
FIG. 12 is a flowchart useful for understanding the operation of the re-booting of the IP telephone switch of the alternative embodiment shown in FIG. 10.

With reference to the flowchart shown in FIG. 12, the operation of the instant, alternative embodiment will now be described for a case in which the IP telephone switch 1 is rebooted, for example, to cause information to be erased from a main memory in its volatile storage area. In response to the above-stated event occurring, the IP telephone switch 1 references the subscriber information database 2 to collect the information of the subscribers shown in FIG. 10, step F151. On each of the subscriber premises units thus collected, the operational steps F451 and F152 to F155 will be carried out as read below.

The IP telephone switch 1 verifies whether or not the IP address of the target subscriber premises unit 3 has timed out, in other words, whether or not the term of validity of the target subscriber premises unit has expired, step F451. If the IP address has not timed out, the IP telephone switch commands initializing the subscriber premises unit 3, step F152, and confirms whether or not a normal end response has been received in time from the subscriber premises unit 3 commanded to be initialized, step F153. The IP telephone switch 1 carries out the above step F451 for another subscriber premises unit 3 to be processed.

If a normal end response has not been received in time from the new target subscriber premises unit 3, then the IP telephone switch 1 verifies whether or not the number of times of initializing operations is within a predetermined value, step F154. If the number is equal to or less than the predetermined value, the IP telephone switch 1 re-issues an initializing command to the same subscriber premises unit 3, step F152. If the number has exceeded the predetermined value, the IP telephone switch 1 clears the IP address of the subscriber premises unit 3 under processing from the subscriber information database 2, step F155. If the IP address of the target subscriber premises unit 3 has timed out, then the IP address of the subscriber premises unit 3 to be processed is similarly cleared from the subscriber information database 2, step F155.

With the instant, alternative embodiment, the term of validity of the IP address may be managed from one subscriber premises unit to another in the IP telephone switch 1. Hence, in addition to the meritorious effect of the embodiment shown in FIG. 1, the alternative embodiment can avert call processing or initializing for a subscriber premises unit which has not been available to the user without notifying the service provider, e.g. in a long term power-down state, so that it becomes possible to alleviate the load in the traffic in the control of subscriber premises units and the load on the IP telephone switch.

Referring to the drawings, still another alternative embodiment will be described in detail of the IP communications system according to the present invention. The architecture of the IP communications system of the instant, alternative embodiment, specifically IP telephone system, may be represented by FIG. 5, with reference to which the alternative embodiments have been described above. The present alternative embodiment may be the same as, but differs slightly from, the alternative embodiments already described with reference to FIG. 5. In particular, the present embodiment differs in the functions of the IP telephone switch 21, information held by the subscriber information database 22 and the functions of the subscriber premises unit 3.

The subscriber information database 22 of the present alternative embodiment differs from the corresponding component of the alternative embodiments already described in that the former has a field in which to set the term of validity of the IP address, as shown in FIG. 13.

The subscriber premises unit 23 of the present alternative embodiment differs from the corresponding component of the embodiments already described in the former having the function of notifying the term of validity together with the notification of the IP telephone switch 21 of an IP address.

The IP telephone switch 21 of the instant embodiment differs from the embodiments already described with reference to FIG. 5 in that the former has the following five functions. Specifically, the IP telephone switch 21 of the instant embodiment involves the function of setting the term of validity received in a field of the term of validity of data shown in FIG. 13 corresponding to an appropriate subscriber premises unit. The switch 21 has the function of referencing the term of validity to process a call, and processing a call only when the term of validity has not expired. The switch 21 also has the function of extracting, when the main memory has been initialized by powering on of off or resetting the own apparatus, a subscriber premises unit which has its IP address registered in the subscriber information database 22 and its term of validity not expired. The switch 21 includes the function of requesting the DDNS server 28 to donate an IP address only for subscriber premises units not handled under processing described above to collect IP addresses. The switch 21 is also provided with the function of commanding the initializing of subscriber premises units, of which information has been collected with the two functions described immediately above.

The operation of allocating an IP address allocation of the IP telephone system of the present, alternative embodiment will be briefly described. Although a flowchart for the operation of allocating an IP address is not shown in regard to the present embodiment, the overall flow of processing may be similar to that shown in FIG. 9 of the aforementioned embodiment or that of FIG. 7 in respect of the alternative embodiment shown in FIG. 5.

Now, referring to FIG. 9, the points of difference from the embodiment already described will be described. The operation of allocating an IP address in the instant, alternative embodiment may be the same as that of the embodiment already described except that in the former there is no step corresponding to the decision step F106 at the subscriber premises unit 3 shown in FIG. 9, the notification of the allocation of an IP address in a step F228 is transmitted along with at least the term of validity of the IP address, and, in a step F229, not only the IP address but also its term of validity is held in the subscriber information database 22.

The operation in which the information on a main memory has been erased from its volatile storage area due to, e.g. rebooting, in the IP telephone switch 1, will now be described with reference to the flowchart shown in FIG. 14.

The IP telephone switch 21 references the subscriber information database 22 in response to the above-stated event, and collects data pertinent to the subscribers shown in FIG. 13, step F251. The IP telephone switch 21 collects information pertinent to subscriber premises units, the IP address of which has been registered and in which the IP address has not timed out, step F551. The IP telephone switch 12 collects information pertinent to subscriber premises units, the IP address of which has not been registered or in which the IP address has timed out. The IP telephone switch 21 requests the DDNS server 28 to donate IP addresses with at least the respective host names used as parameters to acquire IP addresses, step F552.

For the totality of the subscriber premises units 23, the IP addresses of which have been collected through steps F551 and F552, the IP telephone switch 21 executes the initializing command or processing responsive to a return thereto, steps F152 to F154, F254 and F255, as with the alternative embodiments described earlier.

The instant, alternative embodiment gives, in addition to those of the alternative embodiments described earlier, such a meritorious effect that, by suppressing inquiries to the DDNS server concerning a subscriber premises unit where the term of validity of its IP address has not expired, the load involved in inquiries to the DDNS server may be alleviated.

The subscriber information database and the IP telephone switch may be formed in physically the same server. After the IP telephone switch is rebooted, data of the subscriber information database may be placed on a main memory of the IP telephone switch, or may be available by accessing the subscriber information database as needed even after the rebooting.

Procedures or protocols between the IP address allocator and the subscriber premises unit may also be, other than DHCP, PPPoE (Point-to-Point Protocol over Ethernet (trademark).

The subscriber premises unit may be a single unit having the splitting, modem and VoIP gateway functions loaded thereon, or implemented into separate devices each implementing one of the functions. The subscriber premises unit and the analog telephone set may be formed into a sole device. The gateway (MG) is not limited to the subscriber premises unit illustrated.

In an application in which a MAC address is used as information providing an end point identifier, other kinds of information such as serial numbers or telephone numbers may additionally be employed.

Although the above-described embodiments are directed to a VoIP telephone system, the present invention may be applied to an IP communications system directed to transmitting signals other than voice.

The entire disclosure of Japanese patent application No. 2004-161634 filed on May 31, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An IP (Internet protocol) communications system comprising:
   one of a plurality of gateway devices having a subscriber terminal interconnected thereto;
   a gateway controller provided on a subscriber side in accordance with a protocol complying with a master-slave architecture for controlling said gateway device;
   a subscriber information database for supplying subscriber information to said gateway controller; and
   an IP address allocator for dynamically allocating IP addresses;
   said gateway device requesting said IP address allocator to allocate an IP address to acquire the IP address, said IP address then being notified to said gateway controller,
   said IP address allocator including a relationship between identification information of all of said plurality of gateway devices allowed for donation of the IP addresses and identification information of said gateway controller supervising said plurality of gateway devices, and a list of IP addresses;
   the list of the IP addresses being constructed so that at least the identification information of said gateway device, which is a destination of allocation, is associated with a term of validity thereof, from one IP address to another, the identification information of said gateway device and the term of validity being held for IP addresses already allocated, neither the identification information nor the term of validity being held for IP addresses not allocated, the list being managed whether or not the IP addresses have been allocated; and
   said IP address allocator receiving a request for allocation of the IP address from said gateway device to confirm that said IP address allocator holds the identification information of said gateway device associated with the request, and thereafter allocating, if the identification information of said gateway device is held in the list of the IP addresses, a same IP address to update the term of validity, said IP address allocator selecting, if the identification information of said gateway device is not held in the list of the IP addresses, one of unallocated IP addresses to return the selected IP address and the identification information of said gateway controller, the identification information of said gateway device as the destination of allocation being held in a storage location of the IP address in the list of the IP addresses together with the term of validity associated therewith.

2. The IP communications system in accordance with claim 1, wherein said gateway device includes:
   a function of separating a signal of a telephone service from a signal of an IP service transmitted from a public switched telephone network to a subscriber, and mixing signals transmitted from the subscriber to the public switched telephone network;
   a function of transmitting the identification information of said own gateway device to said IP address allocator to thereby request said IP address allocator to donate an IP address and to get the identification information of a gateway controller supervising said own gateway device, and of receiving and holding information returned from said IP address allocator responsively to the request;
   a function of using an IP address donated from said IP address allocator to establish an Internet connection;
   a function of connecting to an analog telephone set as a terminal device;
   a function of processing a signal for connecting to the analog telephone set to provide the IP telephone service; and
   a function of being responsive to donation of the IP address to issue a control signal based on IP telephone control signal processing, the control signal having an end point identifier including a MAC (Media Access Control) address as the identification information of said own gateway device.

3. The IP communications system in accordance with claim 1, wherein said subscriber information database includes a non-volatile storage area for managing information identifying said gateway device, at least an end point identifier including a MAC address used as information uniquely identifying said gateway device, the IP address allocated and a telephone number identifying the subscriber.

4. The IP communications system in accordance with claim 1, wherein said gateway controller includes:
   a function of using information managed by said subscriber information database to control, via an IP network and a carrier network, said gateway device by a protocol complying with a master-slave architecture to thereby provide an IP telephone service to a subscriber interconnected to the carrier network;

a function of collating, upon accepting a notification of IP address allocation from said gateway device, the information identifying said gateway device included in the notification to the information managed by said subscriber information database; and a function of acquiring, in a case of success in collation, the IP address of the source of transmission included in an IP packet of the notification, and holding the IP address acquired in said subscriber information database as an IP address associated with the identification information of an appropriate gateway device.

5. The IP communications system in accordance with claim 4, wherein said gateway controller includes:

a function of acquiring, when said own gateway controller is initialized, information pertinent to a totality of subscribers registered from said subscriber information database, and sending out a command message for state initialization to each of said plurality of gateway devices holding IP addresses;

a function of repeatedly sending out a command message for initialization a predetermined number of times if a response representing the successful initialization cannot be received within a predetermined period of time, from said plurality of gateway devices; and a function of invalidating an appropriate IP address set in said subscriber information database if the response representing the successful initialization cannot be received after repetition of the command message of the predetermined number of times.

6. The IP communications system in accordance with claim 1, further comprising a host name/IP address converting server for managing the host name and the IP address correlatively with each other.

7. The IP communications system in accordance with claim 6, wherein said IP address allocator holds a relationship between the identification information of said plurality of gateway devices allowed for acquisition of IP addresses, the identification information of said gateway controller supervising said plurality of gateway devices, and the identification information for accessing to said host name/IP address converting server associated with said plurality of gateway devices, and a list of IP addresses;

the list of the IP addresses being constructed so that at least the identification information of said gateway device, which is a destination of allocation, is associated with the term of validity thereof from one IP address to another, the identification information of said gateway device and the term of validity being held for IP addresses already allocated, neither the identification information nor the term of validity being held for IP addresses not allocated, the list being managed whether or not the IP addresses have been allocated;

said IP address allocator receiving a request for allocation of the IP address from said gateway device to confirm that said IP address allocator holds the identification information of said gateway device associated with the request, and thereafter allocating, if the identification information of said gateway device is held in the list of the IP addresses, again a same IP address to update the term of validity, said IP address allocator selecting, if the identification information of said gateway device is not held in the list of the IP addresses, one of unallocated IP addresses to return the selected IP address, the identification information of said gateway controller and the identification information for accessing to said host name/IP address converting server, the identification information of said gateway device as the destination of allocation being held in a storage location of the IP address in the list of the IP addresses together with the term of validity associated therewith.

8. The IP communications system in accordance with claim 6, wherein said gateway device includes:

a function of separating a signal of a telephone service from a signal of an IP service transmitted from a public switched telephone network to a subscriber and mixing signals transmitted from the subscriber to the public switched telephone network;

a function of transmitting the identification information of the own gateway device to said IP address allocator to thereby request said IP address allocator to donate an IP address and to get the identification information of a gateway controller supervising said own gateway device, and of receiving and holding information returned from said IP address allocator responsively to the request;

a function of using an IP address donated from said IP address allocator to establish an Internet connection;

a function of connecting to an analog telephone set as a terminal device;

a function of processing a signal for connecting to the analog telephone set to implement the IP telephone service;

a function of being responsive to donation of the IP address to issue a control signal based on IP telephone control signal processing, the control signal having an end point identifier including a MAC (Media Access Control) address as the identifying information of said own gateway device; and a function for a client of being responsive to the allocation of the IP address to request said host name/IP address converting server to register the IP address, with at least the name of the own host and the allocated IP address used as parameters.

9. The IP communications system in accordance with claim 6, wherein said subscriber information database includes a non-volatile storage area for use in managing information which identifies said gateway device and includes at least an end point identifier including a MAC address used as information uniquely identifying said gateway device, the IP address allocated, a telephone number identifying the subscriber or a host name.

10. The IP communications system in accordance with claim 6, wherein said gateway controller includes:

a function of acquiring, when said own gateway controller is initialized, information pertinent to a totality of subscribers registered from said subscriber information database, requesting said host name/IP address converting server to donate the IP address based on the host name included therein, setting an IP address setting field in said subscriber information database for a gateway device which has acquired the IP address and to which the host name has been donated, and sending out a command message for state initialization to said gateway device which has acquired the IP address;

a function of repeatedly sending out a command message for initialization a predetermined number of times if a response representing the successful initialization cannot be received within a predetermined period of time, from said gateway device which has acquired the IP address; and a function of invalidating an appropriate IP address set in the subscriber information database if the response representing the successful initialization cannot be received after repetition of the command message of the predetermined number of times.

11. The IP communications system in accordance with claim 10, wherein said gateway controller includes:
   a function of acquiring, upon receipt of the notification of the IP address allocation from one of said plurality of gateway devices, the host name of said one gateway device, based on data managed by said subscriber information database, requesting said host name/IP address converting server to donate the IP address with at least the host name used as a parameter, and receiving a result; and
   a function of collating the IP address acquired to the IP address of the source of transmission in the notification of the IP address allocation from said one gateway device, and holding, only in a case of coincidence, the IP address as an IP address of said one gateway device in said subscriber information database.

12. The IP communications system in accordance with claim 11, wherein, when notifying said gateway controller of the IP address allocation, said gateway controller notifies the term of validity of the allocated IP address donated from said IP address allocator together therewith.

13. The IP communications system in accordance with claim 12, wherein said subscriber information database includes a non-volatile storage area for use in managing information which identifies said gateway device and includes at least an end point identifier including a MAC address used as information uniquely identifying said gateway device, the IP address allocated, the term of validity thereof or a telephone number identifying the subscriber.

14. The IP communications system in accordance with claim 13, wherein said gateway controller includes:
   a function of using information managed by said subscriber information database to control, via an IP network and a carrier network, said gateway device by a protocol complying with a master-slave architecture to thereby provide an IP telephone service to a subscriber interconnected to a carrier network;
   a function of collating, upon accepting a notification of IP address allocation from said gateway device, the information identifying said gateway device included in the notification to the information managed by said subscriber information database;
   a function of acquiring, in a case of success in collation, the IP address of the source of transmission included in an IP packet of the notification, retaining the IP address thus acquired to be an IP address corresponding to the identification information of the appropriate gateway device, and holding the IP address in said subscriber information database along with the term of validity included in the notification; and
   a function of referencing the term of validity when processing a call to process a call only when the term of validity has not expired.

15. The IP communications system in accordance with claim 14, wherein said gateway controller includes a function of referencing the term of validity when the own gateway controller is initialized to command the state initialization of said gateway device only when the term of validity has not expired.

16. The IP communications system in accordance with claim 8, wherein, when notifying said gateway controller of the IP address allocation, said gateway device notifies the term of validity of the IP address allocated by said IP address allocator together therewith.

17. The IP communications system in accordance with claim 16, wherein said subscriber information database includes a non-volatile storage area for use in managing information which identifies said gateway device and includes at least an end point identifier including a MAC address used as the information uniquely identifying said gateway device, the allocated IP address, the term of validity thereof or a telephone number identifying the subscriber.

18. The IP communications system in accordance with claim 17, wherein said gateway controller includes:
   a function of setting, upon receipt of the notification of the IP address allocation from said gateway device, the term of validity received in a field of the term of validity of said gateway device in said subscriber information database; and
   a function of referencing the term of validity when processing a call to process a call only when the term of validity has not expired.

19. The IP communications system in accordance with claim 18, wherein said gateway controller includes:
   a function of locating, when said own gateway controller is initialized, a gateway device, an IP address of which is registered in said subscriber information database with the term of validity of said IP address not expired;
   a function of requesting said host name/IP address converting server to donate the IP address only for a gateway device which is not located to obtain an IP address thereof; and
   a function of commanding the state initialization on said gateway device located and said gateway device of which the IP address is obtained.

20. A method of allocating an IP (Internet protocol) address for an IP communications system comprising:
   providing one of a plurality of gateway devices having a subscriber terminal interconnected thereto;
   providing a gateway controller on a subscriber side in accordance with a protocol complying with a master-slave architecture for controlling the gateway device;
   supplying, from a subscriber information database, subscriber information to the gateway controller, and dynamically allocating IP addresses in an IP address allocator;
   requesting, from the gateway device, the IP address allocator to allocate an IP address to acquire the IP address, notifying the gateway controller of the acquired IP address
   including, by the IP address allocator, a relationship between identification information of all of the plurality of gateway devices allowed for donation of the IP addresses and identification information of the gateway controller supervising the plurality of gateway devices and a list of IP addresses;
   constructing the list of IP addresses so that at least the identification information of the gateway device, which is a destination of allocation, is associated with a term of validity thereof, from one IP address to another; the identification information of the gateway device and the term of validity being held for the IP address already allocated, neither the identification information nor the term of validity being held for the IP addresses not allocated, the list being managed whether or not the IP addresses have been allocated;
   receiving, at the IP address allocator, a request for allocation of the IP address from the gateway device to confirm that the IP address allocator holds the identification information of the gateway device associated with the request;

allocating, in the IP address allocator, if the identification information of the gateway device is held in the list of the IP addresses, a same IP address to update the term of validity, selecting, in the IP address allocator, if the identification information of the gateway device is not held in the list of the IP addresses, one of unallocated IP addresses to return the selected IP address and the identification information of the gateway controller, holding, in the IP address allocator, the identification information of the gateway device as the destination of allocation in a storage location of the IP address in the list of the IP addresses together with the term of validity associated therewith in the IP address allocator.

21. The method in accordance with claim 20, wherein the gateway device further includes:

separating a signal of a telephone service from a signal of an IP service transmitted from a public switched telephone network to a subscriber, and mixing signals transmitted from the subscriber to the public switched telephone network;

transmitting the identification information of the own gateway device to the IP address allocator to thereby request the IP address allocator to donate an IP address and to get the identification information of a gateway controller supervising the own gateway device, and of receiving and holding information returned from the IP address allocator responsively to the request;

using an IP address donated from the IP address allocator to establish an Internet connection;

connecting to an analog telephone set as a terminal device;

processing a signal for connecting to the analog telephone set to provide the IP telephone service; and responding to donation of the IP address to issue a control signal based on IP telephone control signal processing, the control signal having an end point identifier including a MAC (Media Access Control) address as the identification information of the own gateway device.

22. The method in accordance with claim 20, wherein the subscriber information database includes a non-volatile storage area to manage information identifying the gateway device, at least an end point identifier including a MAC address used as information uniquely identifying the gateway device, the IP address allocated and a telephone number identifying the subscriber.

23. The method in accordance with claim 20, wherein the gateway controller further includes:

using information managed by the subscriber information database to control, via an IP network and a carrier network, the gateway device by a protocol complying with a master-slave architecture to thereby provide an IP telephone service to a subscriber interconnected to the carrier network;

collating, upon accepting a notification of IP address allocation from the gateway device, the information identifying the gateway device included in the notification to the information managed by the subscriber information database; and acquiring, in a case of success in collation, the IP address of the source of transmission included in an IP packet of the notification, and holding the IP address acquired in the subscriber information database as an IP address associated with the identification information of an appropriate gateway device.

24. The method in accordance with claim 23, wherein the gateway controller includes:

acquiring, when the own gateway controller is initialized, information pertinent to a totality of subscribers registered from the subscriber information database, and sending out a command message for state initialization to each of the plurality of gateway devices holding IP addresses;

repeatedly sending out a command message for initialization a predetermined number of times if a response representing the successful initialization cannot be received within a predetermined period of time, from the plurality of gateway devices; and invalidating an appropriate IP address set in the subscriber information database if the response representing the successful initialization cannot be received after repetition of the command message of the predetermined number of times.

25. The method in accordance with claim 20, wherein the IP communications system further comprises a host name/IP address converting server to manage the host name and the IP address correlatively with each other from a host name/IP address converting server.

26. The method in accordance with claim 25, wherein holding, in the IP address allocator, a relationship between the identification information of the plurality of gateway devices allowed for acquisition of IP addresses, the identification information of the gateway controller supervising the plurality of gateway devices, and the identification information for accessing to the host name/IP address converting server associated with the plurality of gateway devices, and a list of IP addresses;

constructing, in the IP address allocator, the list of the IP addresses so that at least the identification information of the gateway device which is a destination of allocation is associated with the term of validity thereof from one IP address to another, the identification information of the gateway device and the term of validity being held for IP addresses already allocated, neither the identification information nor the term of validity being held for IP addresses not allocated, the list being managed whether or not the IP addresses have been allocated;

receiving, at the IP address allocator, a request for allocation of the IP address from the gateway device to confirm that the IP address allocator holds the identification information of the gateway device associated with the request, and thereafter allocating, if the identification information of the gateway device is held in the list of the IP addresses, again a same IP address to update the term of validity, selecting, at the IP address allocator, one of unallocated IP addresses to return the selected IP address, the identification information of the gateway controller and the identification information for accessing to the host name/IP address converting server if the identification information of the gateway device is not held in the list of the IP addresses, holding, in the IP address allocator, the identification information of the gateway device as the destination of allocation in a storage location of the IP address in the list of the IP addresses together with the term of validity associated therewith.

27. The method in accordance with claim 25, wherein the gateway device further includes:

separating a signal of a telephone service from a signal of an IP service transmitted from a public switched telephone network to a subscriber and mixing signals transmitted from the subscriber to the public switched telephone network;

transmitting the identification information of the own gateway device to the IP address allocator to thereby request the IP address allocator to donate an IP address and to get the identification information of a gateway controller supervising the own gateway device, and of receiving and holding information returned from the IP address allocator responsively to the request;

using an IP address donated from the IP address allocator to establish an Internet connection;

connecting to an analog telephone set as a terminal device;

processing a signal for connecting to the analog telephone set to implement the IP telephone service;

being responsive to donation of the IP address to issue a control signal based on IP telephone control signal processing, the control signal having an end point identifier including a MAC (Media Access Control) address as the identifying information of the own gateway device; and responding, for a client, to the allocation of the IP address to request the host name/IP address converting server to register the IP address, with at least the name of the own host and the allocated IP address used as parameters.

28. The method in accordance with claim 25, wherein the subscriber information database includes a non-volatile storage area to manage information identifying the gateway device, at least an end point identifier including a MAC address as information uniquely identifying the gateway device, the IP address allocated, a telephone number identifying the subscriber and a host name.

29. The method in accordance with claim 25, wherein the gateway controller further includes:

acquiring, when the own gateway controller is initialized, information pertinent to a totality of subscribers registered from the subscriber information database, requesting the host name/IP address converting server to donate the IP address based on the host name included therein, setting an IP address setting field in the subscriber information database for a gateway device which has acquired the IP address and to which the host name has been donated, and sending out a command message for state initialization to the gateway device which has acquired the IP address;

sending out a command message, repeatedly, for initialization a predetermined number of times if a response representing the successful initialization cannot be received within a predetermined period of time, from the gateway device which has acquired the IP address; and invalidating an appropriate IP address set in the subscriber information database if the response representing the successful initialization cannot be received after repetition of the command message of the predetermined number of times.

30. The method in accordance with claim 29, wherein the gateway controller further includes:

acquiring, upon receipt of the notification of the IP address allocation from one of the plurality of gateway devices, the host name of the one gateway device, based on data managed by the subscriber information database, requesting the host name/IP address converting server to donate the IP address with at least the host name used as a parameter, and receiving a result; and collating the IP address acquired to the IP address of the source of transmission in the notification of the IP address allocation from the one gateway device, and holding, only in a case of coincidence, the IP address as an IP address of the one gateway device in the subscriber information database.

31. The method in accordance with claim 30, wherein, when notifying the gateway controller of the IP address allocation, the gateway controller notifies the term of validity of the allocated IP address donated from the IP address allocator together therewith.

32. The method in accordance with claim 31, wherein the subscriber information database includes a non-volatile storage area to manage information identifying the gateway device, at least an end point identifier including a MAC address as information uniquely identifying the gateway device, the IP address allocated, the term of validity thereof and a telephone number identifying the subscriber.

33. The method in accordance with claim 32, wherein the gateway controller further includes:

using information managed by the subscriber information database to control, via an IP network and a carrier network, the gateway device by a protocol complying with a master-slave architecture to thereby provide an IP telephone service to a subscriber interconnected to a carrier network;

collating, upon accepting a notification of IP address allocation from the gateway device, the information identifying the gateway device included in the notification to the information managed by the subscriber information database;

acquiring, in a case of success in collation, the IP address of the source of transmission included in an IP packet of the notification, retaining the IP address thus acquired to be an IP address corresponding to the identification information of the appropriate gateway device, and holding the IP address in the subscriber information database along with the term of validity included in the notification; and referencing the term of validity when processing a call to process a call only when the term of validity has not expired.

34. The method in accordance with claim 33, wherein the gateway controller further includes:

referencing the term of validity when the own gateway controller is initialized to command the state initialization of the gateway device only when the term of validity has not expired.

35. The method in accordance with claim 27, wherein said gateway device notifies, when notifying the gateway controller of the IP address allocation, the gateway controller of the term of validity of the IP address allocated by the IP address allocator together with the IP address allocation.

36. The method in accordance with claim 35, wherein the subscriber information database includes a non-volatile storage area to manage information identifying the gateway device, at least an end point identifier including a MAC address as the information uniquely identifying the gateway device, the allocated IP address, the term of validity thereof and a telephone number identifying the subscriber.

37. The method in accordance with claim 36, wherein the gateway controller further includes:

setting, upon receipt of the notification of the IP address allocation from the gateway device, the term of validity received in a field of the term of validity of the gateway device in the subscriber information database; and referencing the term of validity when processing a call to process a call only when the term of validity has not expired.

38. The method in accordance with claim 37, wherein the gateway controller further includes:

locating, when the own gateway controller is initialized, a gateway device, an IP address of which is registered in the subscriber information database with the term of validity of the IP address not expired;

requesting the host name/IP address converting server to donate the IP address only for a gateway device which is not located to obtain an IP address thereof; and commanding the state initialization on the gateway device located and the gateway device of which the IP address is obtained.

* * * * *